United States Patent
Yamada

(10) Patent No.: US 9,287,767 B2
(45) Date of Patent: Mar. 15, 2016

(54) DC VOLTAGE CONVERSION CIRCUIT HAVING OUTPUT VOLTAGE WITH A PREDETERMINED MAGNITUDE

(71) Applicant: FUJI ELECTRIC CO., LTD., Kawasaki-shi (JP)

(72) Inventor: Ryuji Yamada, Hachioji (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 0 days.

(21) Appl. No.: 14/177,284

(22) Filed: Feb. 11, 2014

(65) Prior Publication Data

US 2014/0268963 A1 Sep. 18, 2014

(30) Foreign Application Priority Data

Mar. 12, 2013 (JP) .................................. 2013-048738

(51) Int. Cl.
| | | |
|---|---|---|
| G05F 1/00 | (2006.01) | |
| H02H 7/122 | (2006.01) | |
| H02M 7/00 | (2006.01) | |
| H02M 1/34 | (2007.01) | |

(52) U.S. Cl.
CPC .......... *H02M 1/34* (2013.01); *H02M 2001/346* (2013.01); *Y02B 70/1491* (2013.01); *Y10T 307/50* (2015.04)

(58) Field of Classification Search
USPC ........ 323/222, 229–231; 363/56.12, 123, 124
See application file for complete search history.

(56) References Cited

U.S. PATENT DOCUMENTS

| | | | | |
|---|---|---|---|---|
| 5,636,114 A | * | 6/1997 | Bhagwat et al. | 363/56.12 |
| 6,188,207 B1 | * | 2/2001 | Kitajima | 323/222 |
| 6,236,191 B1 | * | 5/2001 | Chaffai | 323/225 |
| 6,434,029 B1 | * | 8/2002 | Cyr et al. | 363/86 |
| 7,385,833 B2 | * | 6/2008 | Keung | 363/56.12 |
| 2004/0036451 A1 | * | 2/2004 | Itoh et al. | 323/225 |
| 2006/0274558 A1 | | 12/2006 | Keung | |
| 2012/0068678 A1 | * | 3/2012 | Hatae et al. | 323/272 |
| 2012/0306463 A1 | | 12/2012 | Athas et al. | |

FOREIGN PATENT DOCUMENTS

| | | |
|---|---|---|
| JP | 10-136637 A | 5/1998 |
| WO | 9423488 A1 | 10/1994 |

OTHER PUBLICATIONS

European Extended Search Report dated Aug. 8, 2014 issued in corresponding European Application No. 14154313.2.

\* cited by examiner

*Primary Examiner* — Adolf Berhane
*Assistant Examiner* — Gary Nash
(74) *Attorney, Agent, or Firm* — Rossi, Kimms & McDowell LLP

(57) ABSTRACT

Aspects of the invention relates to a DC voltage conversion circuit including: a DC power supply; a switching device which is connected to two ends of the DC power supply through an inductor; and a series circuit which is connected in parallel with the switching device and which includes a diode and a load, so that an input voltage supplied from the DC power supply can be converted into an output voltage with a predetermined magnitude by an operation of the switching device and supplied to the load. The DC voltage conversion circuit can further include: a series circuit which is connected to two ends of the diode and which includes a snubber capacitor and a snubber diode.

4 Claims, 10 Drawing Sheets

1 : DC POWER SUPPLY
2 : INDUCTOR
3 : SEMICONDUCTOR SWITCHING DEVICE
4 : DIODE
5 : CAPACITOR
6 : LOAD
1 0 1 : SNUBBER DIODE
1 0 2 : DIODE
1 0 3 : SNUBBER CAPACITOR
1 0 4 : DC POWER SUPPLY
A : PARASITIC INDUCTANCE
P : POSITIVE TERMINAL
N : NEGATIVE TERMINAL

1 : DC POWER SUPPLY
2 : INDUCTOR
3 : SEMICONDUCTOR SWITCHING DEVICE
4 : DIODE
5 : CAPACITOR
6 : LOAD
1 0 1 : SNUBBER DIODE
1 0 2 : DIODE
1 0 3 : SNUBBER CAPACITOR
1 0 4 : DC POWER SUPPLY
A : PARASITIC INDUCTANCE
P : POSITIVE TERMINAL
N : NEGATIVE TERMINAL

105 : INDUCTOR 1 0 6 : INDUCTOR 2 a : AUXILIARY WINDING 4 a : SEMICONDUCTOR SWITCHING DEVICE
2 0 1, 2 0 2 : DIODE
2 0 3 : CAPACITOR
2 0 4 : DC POWER SUPPLY

US 9,287,767 B2

DC VOLTAGE CONVERSION CIRCUIT HAVING OUTPUT VOLTAGE WITH A PREDETERMINED MAGNITUDE

CROSS-REFERENCE TO RELATED APPLICATION

This application is based on, and claims priority to, Japanese Patent Application No. 2013-048738, filed on Mar. 12, 2013. The disclosure of the priority application, in its entirety, including the drawings, claims, and the specification thereof, is incorporated herein by reference.

BACKGROUND OF THE INVENTION

1. Field of the Invention

Embodiments of the invention relate to DC voltage conversion circuits that switch semiconductor switching devices to convert a DC voltage into a DC voltage having a predetermined magnitude.

2. Related Art

FIG. 7 shows a first background-art technique of this kind of DC voltage conversion circuit.

In FIG. 7, one end of an inductor 2 is connected to a positive electrode of a DC power supply 1, and a semiconductor switching device 3 such as an MOSFET is connected between the other end of the inductor 2 and a negative electrode of the DC power supply 1. A diode 4 and a capacitor 5 are connected in series to two ends (between a drain electrode d and a source electrode s) of the switching device 3. A load 6 is connected to two ends of the capacitor 5. Incidentally, in FIG. 7, the reference sign P designates a positive terminal of the DC voltage conversion circuit; N, a negative terminal thereof; and A, a parasitic inductance caused by a wiring of the circuit as will be described later.

The DC voltage conversion circuit shown in FIG. 7 is a so-called step-up chopper which converts a DC input voltage into a DC voltage higher than the DC input voltage. Operation of the circuit will be described below. Incidentally, in the following description, assume that a forward voltage drop in a PN junction of the diode etc. is neglected.

When the switching device 3 turns ON, a current flows from the DC power supply 1 back to the DC power supply 1 through the inductor 2 and the switching device 3. An input current $I_{in}$ increases due to a voltage (input voltage) $V_i$ of the DC power supply 1 added to the inductor 2. When the switching device 3 turns OFF, the current flows from the DC power supply 1 back to the DC power supply 1 through the inductor 2, the diode 4 and the capacitor 5. On this occasion, a differential voltage between a voltage (output voltage) $V_o$ of the capacitor 5 and the input voltage $V_i$ is applied to the inductor 2. Accordingly, as will be described later, $I_{in}$ decreases due to $V_o$ which is kept higher than $V_i$.

When a ratio of ON time to OFF time in the switching device 3 is controlled, the magnitude of the input current $I_{in}$ can be controlled desirably. When the input current $I_{in}$ is controlled in accordance with the power consumption of the load 6, the output voltage $V_o$ can be kept at a desired value.

In addition, when the ratio of the ON time in the switching device 3 is increased, the input current $I_{in}$ and further input electric power ($V_i \times I_{in}$) can be theoretically increased unlimitedly. Therefore, the output voltage $V_o$ can be controlled to have any value in a range higher than the input voltage $V_i$. When the ratio of the ON time in the switching device 3 is 0, i.e. when the switching device 3 does not turn ON at all, the output voltage $V_o$ is substantially equal to the input voltage $V_i$.

Generally, an unintended parasitic inductance A is present on a wiring in an electric circuit. A parasitic inductance A existing in a loop circuit from the switching device 3 back to the switching device 3 via the diode 4 and the capacitor 5 is shown in FIG. 7.

FIG. 8 shows voltage and current waveforms when a current flowing into the switching device 3 is commutated to the capacitor 5 through the diode 4.

In FIG. 8, when the switching device 3 starts to turn OFF at a time instant $t_0$, the impedance of the switching device 3 increases and a drain-to-source voltage $V_{ds}$ increases accordingly. When the voltage $V_{ds}$ exceeds the output voltage $V_o$ at a time instant $t_1$, the diode 4 in FIG. 7 conducts electricity so that a current i starts to flow from the switching device 3 back to the switching device 3 through the diode 4, the parasitic inductance A and the capacitor 5.

On this occasion, a voltage (so-called surge voltage) in Mathematical Expression 1 proportional to a change rate of the current i occurs in the parasitic inductance A.

$$\Delta V = L \cdot (di/dt) \qquad \{\text{Math. 1}\}$$

wherein the reference sign L designates an inductance value of the parasitic inductance A.

When $I_d$ designates a drain current of the switching device 3, $i = I_{in} - I_d$ is established. $I_{in}$ may be regarded as constant in a short period of time when the surge voltage $\Delta V$ occurs. Accordingly, (di/dt) is substantially equal to a rate of decrease in $I_d$, i.e. $(-dI_d/dt)$. The surge voltage $\Delta V$ which is added to $V_o$ is applied between the drain and the source of the switching device 3. Accordingly, the drain-to-source voltage $V_{ds}$ is higher than the output voltage $V_o$ in a brief period of time after the time instant $t_1$, as shown in FIG. 8.

When the surge voltage $\Delta V$ is large to exceed the withstanding voltage of the switching device 3, there is a risk that the switching device 3 may be broken down. Therefore, there has been heretofore taken a countermeasure, for example, to contrive a circuit configuration such as a wiring length to make the inductance value L of the parasitic inductance A as small as possible.

On the other hand, higher speed switching can be performed with recent improvement in performance of semiconductor devices. In order to reduce a switching loss, it is desirable that switching is performed in a time as short as possible. However, so-called high speed switching leads to the increase of (di/dt). In such a high speed switching condition, the contrivance on the circuit configuration may have a limit on the reduction of the inductance value L.

Next, FIG. 9 shows a second background-art technique of the DC voltage conversion circuit. In FIG. 9, a different point from the circuit shown in FIG. 7 is that a snubber capacitor 7 is connected in parallel with the diode 4. Thus, the drain-to-source voltage $V_{ds}$ of the switching device 3 can be reduced.

In FIG. 9, in a period of time when the switching device 3 is ON, the snubber capacitor 7 is charged so that a voltage $V_c$ of the snubber capacitor 7 is substantially equal to the output voltage $V_o$.

FIG. 10 shows voltage and current waveforms when a current flowing into the switching device 3 is commutated to the capacitor 5 through the diode 4.

When the switching device 3 starts to turn OFF at a time instant $t_0$ and the drain-to-source voltage $V_{ds}$ becomes slightly larger than 0 [V], a P-to-N voltage $V_{PN}$ ($=V_{ds}+V_c$) exceeds $V_o$ so that a current starts to flow from the inductor 2 to the capacitor 5 through the capacitor 7 and the parasitic inductance A. That is, commutation starts before $V_{ds}$ exceeds $V_o$.

A surge voltage ΔV occurring in the circuit shown in FIG. 9 is equivalent to that in FIG. 7. However, since $V_{ds}=V_o+\Delta V-V_c$ is established in FIG. 9, the peak value of $V_{ds}$ in FIG. 10 is smaller than that in FIG. 8, as apparent from comparison between FIG. 10 and FIG. 8.

A technique in which $V_{ds}$ is suppressed based on the same principle as that in FIGS. 9 and 10 so as to protect a switching device has been described, for example, in JP-A-10-136637 (Paragraphs [0014] to [0016], FIG. 1, etc.).

According to the circuit in FIG. 9, the surge voltage ΔV can be suppressed to be lower than that in the circuit in FIG. 7. However, when the switching device 3 turns ON and the snubber capacitor 7 is charged up to a value equal to the output voltage $V_o$, a loss (charging loss) is generated in the switching device 3 because a charging current flows from the capacitor 5 back to the capacitor 5 through the snubber capacitor 7 and the switching device 3. This power loss reaches $(\frac{1}{2})CV_o^2$ (the references sign C designates the capacitance value of the capacitor 7) regardless of the resistance value of the charging circuit. Even when a charging resistor is placed in the charging circuit of the snubber capacitor 7, the same loss is generated due to that resistor.

In addition, when the switching device 3 is operated at a frequency f, a power loss $P_s$ expressed by Mathematical Expression 2 occurs.

$$P_s=(\tfrac{1}{2})CV_o^2 f \qquad \{\text{Math. 2}\}$$

Accordingly, when the switching frequency f is increased, that is, when the DC voltage conversion circuit is operated at a higher frequency, there is a problem that the aforementioned power loss $P_s$ increases to thereby decrease the overall efficiency of the apparatus.

SUMMARY OF THE INVENTION

Embodiments of the invention address these and other problems in the related art. Embodiments of the invention is to provide a DC voltage conversion circuit which is designed to suppress a surge voltage caused by a parasitic inductance to thereby protect a semiconductor switching device while minimizing a power loss caused by charging of a snubber capacitor to thereby prevent the lowering of the efficiency.

In some embodiments, a DC voltage conversion circuit according to Claim 1 is arranged as a DC voltage conversion circuit including: a first DC power supply; a first semiconductor switching device which is connected to two ends of the first DC power supply through an inductor; and a series circuit which is connected in parallel with the switching device and which includes a rectifier device and a load, so that an input voltage supplied from the first DC power supply can be converted into an output voltage with a predetermined magnitude by a switching operation of the switching device and supplied to the load.

In addition, according to some embodiments of the invention, the DC voltage conversion circuit further includes: a series circuit which is connected to two ends of the rectifier device and which includes a first snubber capacitor and a first snubber diode; and a charging circuit which charges the snubber capacitor to a voltage lower than the input voltage or the output voltage in a period of time when the switching device is ON.

Here, the charging circuit for charging the first snubber capacitor may be either constituted by a series circuit of a second DC power supply and a diode, or constituted by a series circuit of a second DC power supply, an inductor and a diode.

In addition, in some embodiments, a series circuit of a plurality of inductors may be provided so that the charging circuit for charging the first snubber capacitor can be configured in such a manner that one of connection points among these inductors and a connection point between the first snubber capacitor and the first snubber diode are connected through a diode.

Further, in some embodiments, an auxiliary winding may be provided in the inductor so that the charging circuit for charging the first snubber capacitor can be constituted in such a manner that one end of the auxiliary winding and a connection point between the first snubber capacitor and the first snubber diode are connected through a diode.

Moreover, in some embodiments, a second semiconductor switching device which is connected in series with the first semiconductor switching device may be provided in place of the rectifier device so that the rectifier device can be replaced by a rectification function of the semiconductor switching device.

Incidentally, in some embodiments, the charging circuit for charging the first snubber capacitor may be constituted by a series circuit of a second DC power supply and a diode.

Further, in some embodiments, in the DC voltage conversion circuit, a series circuit of a second snubber capacitor and a second snubber diode may be connected in parallel with the first semiconductor switching device, and a series circuit of a third DC power supply and a diode may be connected between a connection point between the second snubber capacitor and the second snubber diode and one end of the load so as to serve as a charging circuit for charging the second snubber capacitor.

According to some embodiments, a power loss caused by charging of a snubber capacitor can be minimized so that the lowering of the efficiency can be prevented. In addition, a surge voltage occurring when a semiconductor switching device is turned OFF can be suppressed so that the semiconductor switching device can be prevented from an overvoltage.

DETAILED DESCRIPTION

Embodiments of the invention will be described below in accordance with the drawings.

Figure 1:
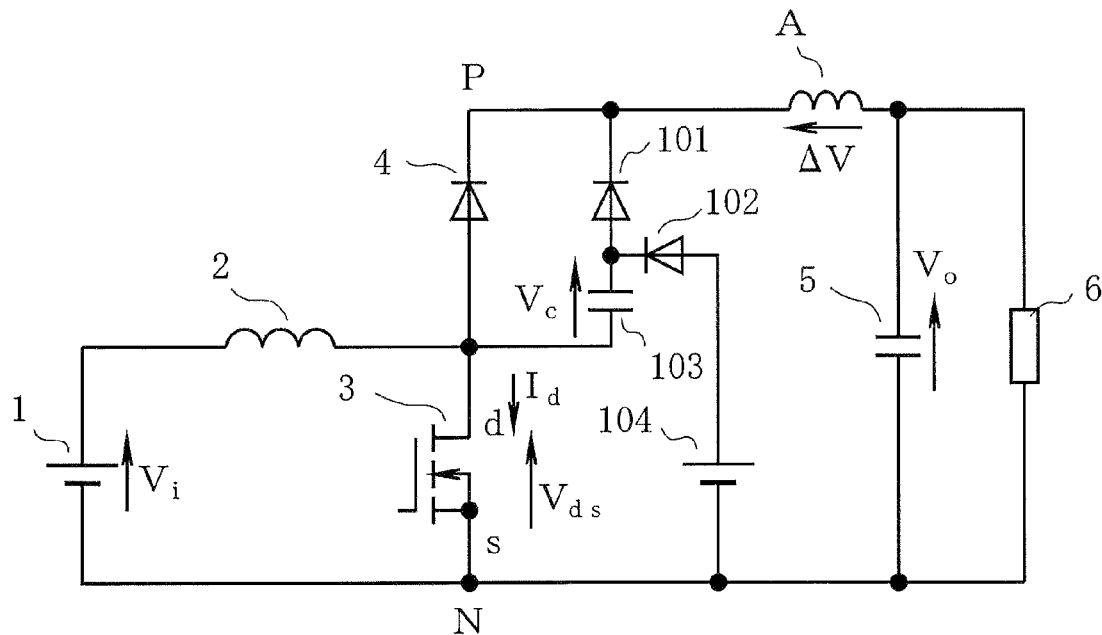
FIG. 1 is a circuit diagram showing a first embodiment of the invention.
Figure 7:
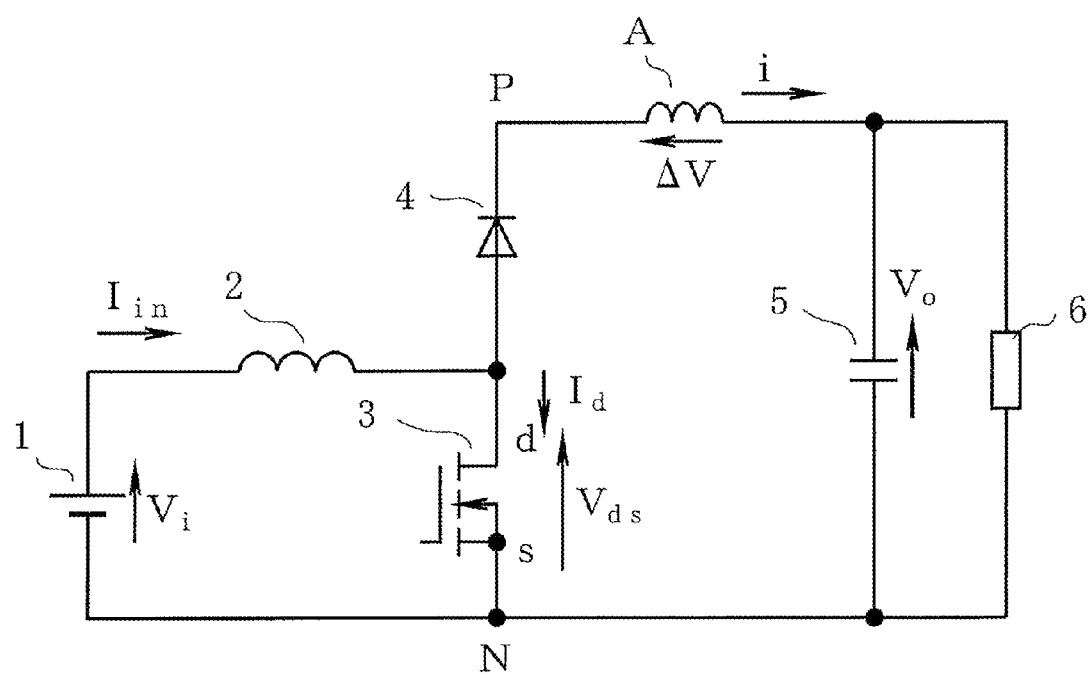
FIG. 7 is a diagram showing a first background-art technique of a DC voltage conversion circuit.
Figure 8:
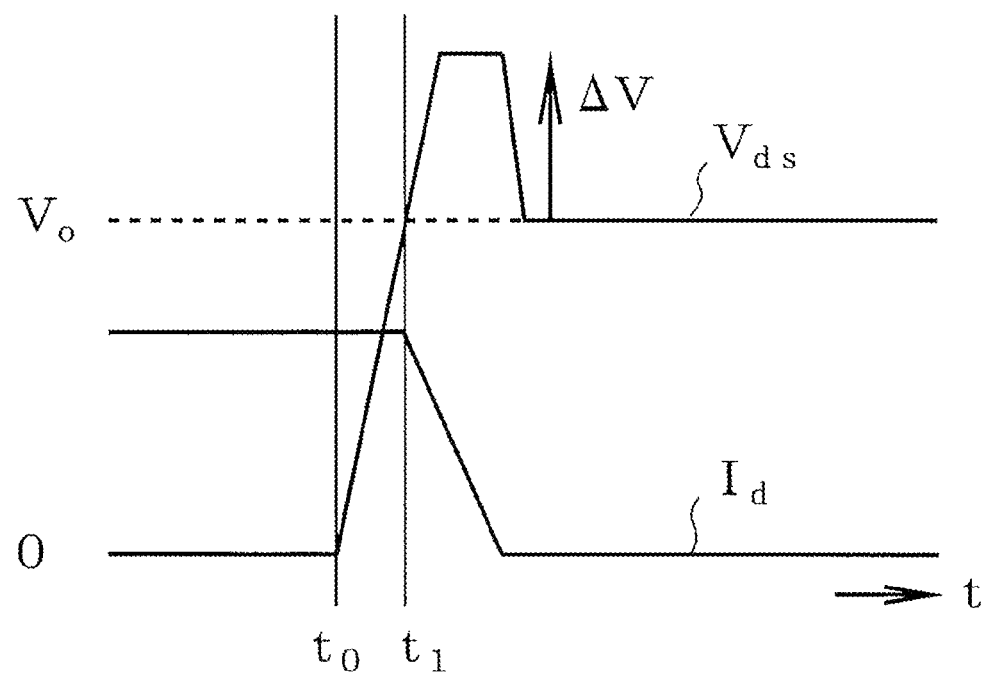
FIG. 8 is a graph of current and voltage waveforms when a current flowing into a semiconductor switching device is commutated to a capacitor in FIG. 7.
Figure 9:
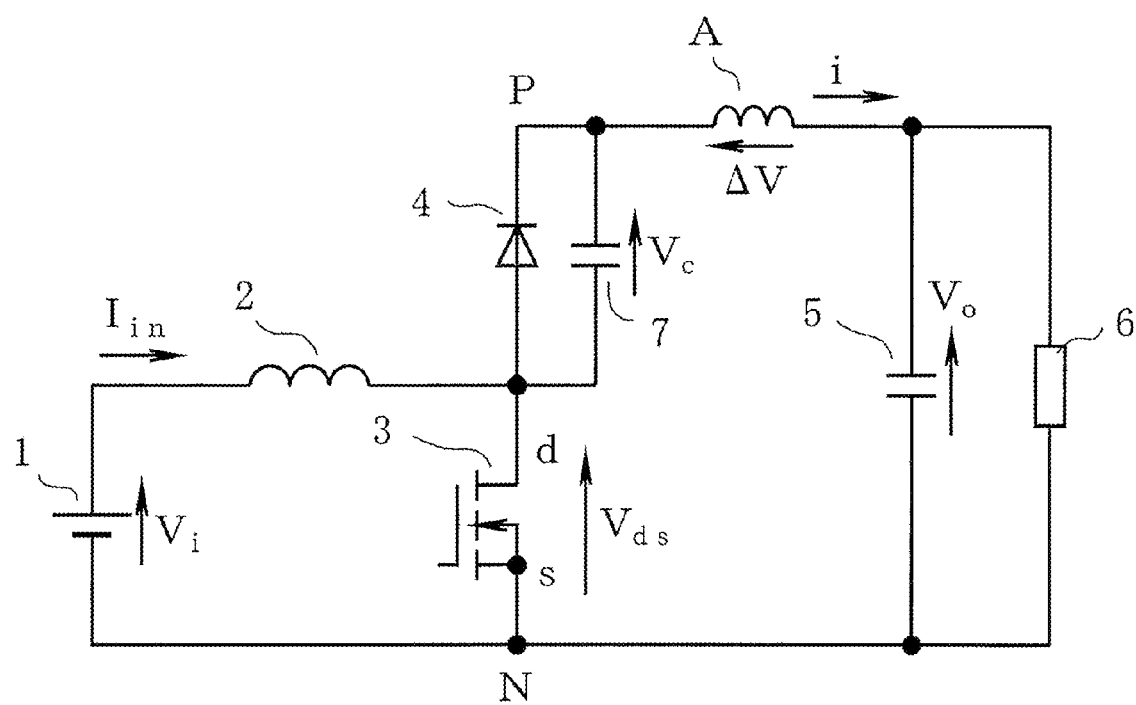
FIG. 9 is a diagram showing a second background-art technique of a DC voltage conversion circuit.
Figure 10:
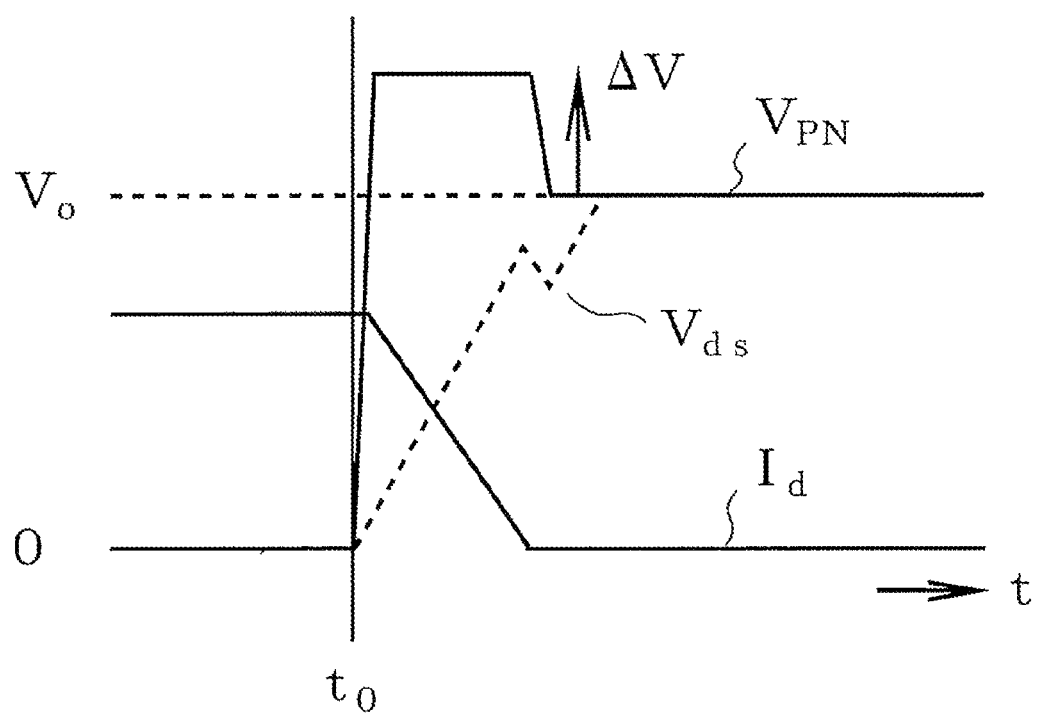
FIG. 10 is a graph of current and voltage waveforms when a current flowing into a semiconductor switching device is commutated to a capacitor in FIG. 9.

FIG. 1 is a circuit diagram showing a first embodiment of the invention. The same devices as those devices in FIGS. 7 and 9 are referred to by the same numerals correspondingly. In the first embodiment, a step-up chopper is also configured in the same manner so that an output voltage $V_o$ which is obtained by increasing an input voltage $V_i$ due to a switching operation of a semiconductor switching device 3 is supplied to a load 6.

In FIG. 1, a connection state of a first DC power supply 1, an inductor 2, the semiconductor switching device 3 such as an MOSFET, a diode 4, a capacitor 5 and the load 6 is the same as that in FIG. 7 or 9. The embodiment is characterized in the point that a series circuit of a snubber diode 101 and a snubber capacitor 103 is connected in parallel with the diode 4 so as to form a snubber circuit, and a diode 102 and a second DC power supply 104 are connected in series between a connection point between the snubber diode 101 and the snubber capacitor 103 and a negative terminal N so as to serve as a charging circuit for charging the snubber capacitor 103. Operation of the embodiment will be described below.

When the switching device 3 is ON, a current flows from the DC power supply 104 back to the DC power supply 104 through the diode 102, the snubber capacitor 103 and the switching device 3. Accordingly, the snubber capacitor 103 is charged so that a voltage $V_c$ of the snubber capacitor 103 is equal to a voltage of the DC power supply 104. Here, for example, assume that an input voltage $V_i$ supplied from the first DC power supply 1 is set at 200 [V], an output voltage $V_o$ is set at 400 [V], and the voltage of the second DC power supply 104 is set at 100 [V].

Figure 2:
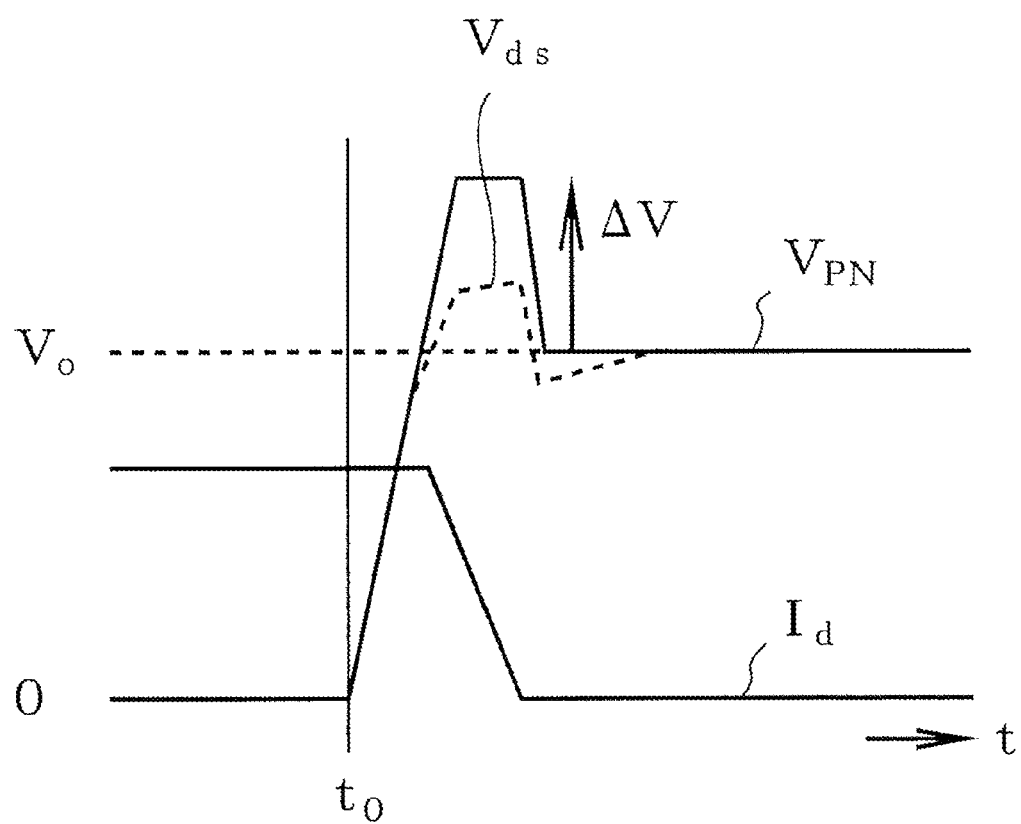
FIG. 2 is a graph of current and voltage waveforms when a current flowing into a semiconductor switching device is commutated to a capacitor in FIG. 1.

FIG. 2 is a graph of current and voltage waveforms when a current flowing into the switching device 3 is commutated to the capacitor 5 in FIG. 1.

When the switching device 3 starts to turn OFF at a time instant to so that the impedance of the switching device 3 increases, a drain-to-source voltage $V_{ds}$ of the switching device 3 starts to increase. However, differently from in FIG. 9, in the embodiment, the current does not flow into the snubber diode 101 and the snubber capacitor 103 unless a value $(V_{ds}+V_c)$ exceeds $V_o$ (=400 [V]), that is, unless $V_{ds}$ exceeds $(V_o-V_c)$=300 [V]. Incidentally, since $V_c$ is equal to the voltage of the DC power supply 104 as described above, $V_c$ is 100 [V].

When the value $(V_{ds}+V_c)$ exceeds $V_o$, a discharging current of the snubber capacitor 103 flows from the inductor 2 to the capacitor 5 through the snubber capacitor 103, the snubber diode 101 and a parasitic inductance A. On this occasion, a surge voltage $\Delta V$ occurs in the parasitic inductance A. However, as apparent from FIG. 1, since $V_{ds}=\Delta V+V_o-V_c$ is established, $V_{ds}$ is kept lower than $\Delta V+V_o$ unless the snubber capacitor 103 ceases to discharge electricity.

That is, the snubber circuit including the snubber diode 101 and the snubber capacitor 103 operates only around a timing when the surge voltage $\Delta V$ occurs. In a period of time before that, the snubber circuit does not discharge electricity unnecessarily. Therefore, even when the charging voltage $V_c$ of the snubber capacitor 103 is low, the surge voltage $\Delta V$ can be suppressed effectively.

In the aforementioned circuit in FIG. 9, the snubber capacitor 7 is charged so that the voltage $V_c$ of the snubber capacitor 7 is substantially equal to the output voltage $V_o$. Accordingly, $V_c$=400 [V]. On the other hand, according to the circuit in FIG. 1, the voltage $V_c$ of the snubber capacitor 103 is equal to the voltage of the second DC power supply 104, i.e. 100 [V]. That is, the voltage $V_c$ in FIG. 1 is ¼ as high as that in FIG. 9. Accordingly, when a capacitance value C of the snubber capacitor 103 is equal to that of the snubber capacitor 7 in FIG. 9, $(½)CV_c^2$ as a charging loss is the square of ¼, i.e. 1/16. Even when the capacitance value of the snubber capacitor 103 is made several times as large as that of the snubber capacitor 7 in FIG. 9, the charging loss is smaller than that of the circuit in FIG. 9. Accordingly, a surge suppression effect can be improved in comparison with the background art.

Figure 3:
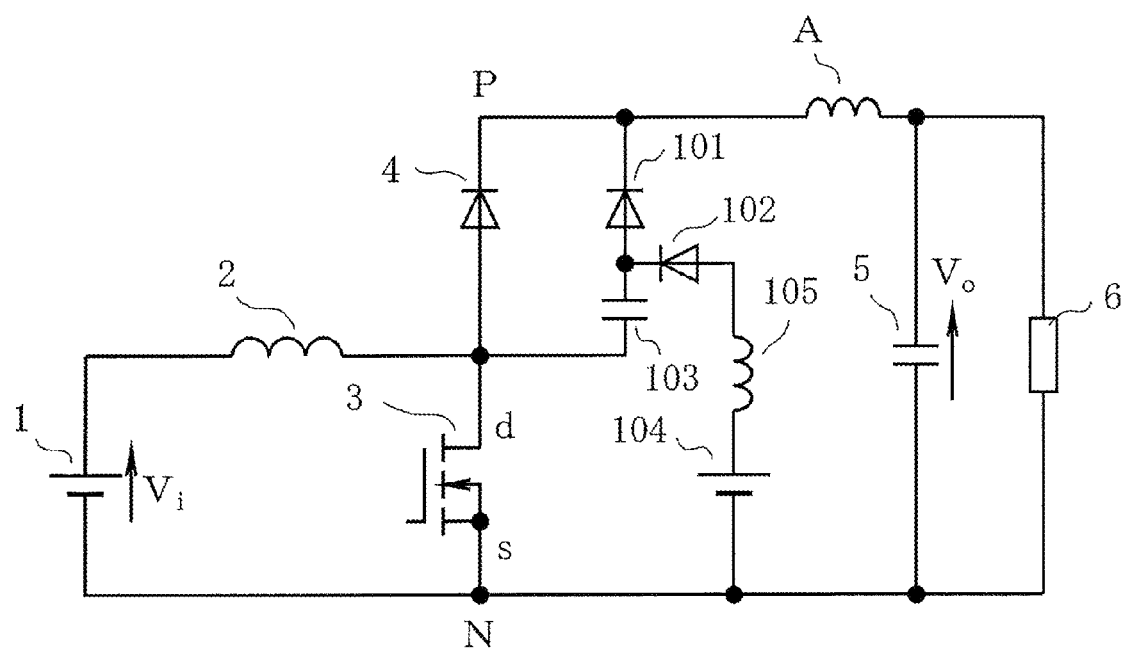
FIG. 3 is a circuit diagram showing a second embodiment of the invention.

Next, FIG. 3 is a circuit diagram showing a second embodiment of the invention. In the embodiment, an inductor 105 is inserted between the diode 102 and the second DC power supply 104 in FIG. 1. The embodiment is aimed at further reducing the charging loss of the snubber capacitor 103.

In the circuit in FIG. 1, the voltage $V_c$ per se of the snubber capacitor 103 is reduced but $(½)CV_c^2$ as the charging loss still occurs in principle.

On the other hand, according to the circuit in FIG. 3, some loss occurs in the diode 102, the inductor 105 and the switching device 3 but the value of the loss is smaller than $(½)CV_c^2$ and can be reduced close to 0 ideally. Incidentally, the snubber capacitor 103 and the inductor 105 incurs LC resonance when the switching device 3 turns ON in the circuit in FIG. 3. As a result, the voltage $V_c$ of the snubber capacitor 103 is charged to be about twice as high as the voltage of the DC power supply 104. Therefore, it is desirable that the voltage of the DC power supply 104 is set at ½ of that in FIG. 1 (the voltage of the DC power supply 104 is set at 50 [V] when the capacitor 103 is intended to be charged to 100 [V]).

Incidentally, in the aforementioned first or second embodiment, an exclusive power supply may be provided as the second DC power supply 104 forming the charging circuit for charging the snubber capacitor 103. Another method may be also conceived. For example, a part of a control power supply may be used, or a part of a serial capacitor may be used when the load 6 is a multilevel converter. However, when an appropriate power supply cannot be prepared, a method shown in a third embodiment in FIG. 4 may be used.

Figure 4:
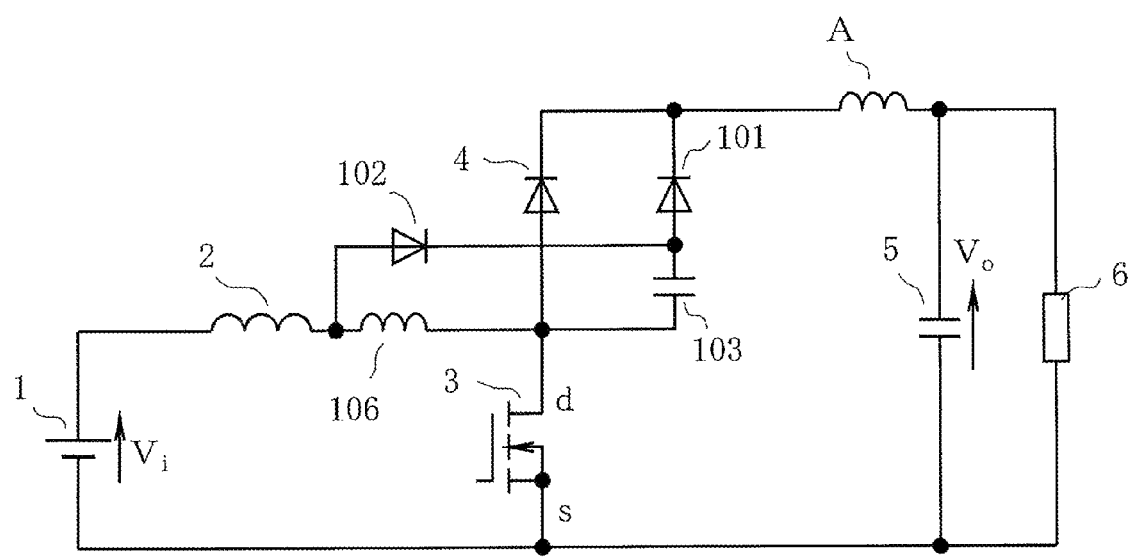
FIG. 4 is a circuit diagram showing a third embodiment of the invention.

That is, as shown in FIG. 4, a second inductor 106 is connected between one end of a first inductor 2 on the opposite side to the first DC power supply 1 and an anode of the diode 4, and the diode 102 is connected between a connection point between the inductors 2 and 106 and an anode of the snubber diode 101 by an illustrated polarity.

In the embodiment, when the switching device 3 turns ON, the voltage of the DC power supply 1 is divided by a series circuit of the inductors 2 and 106. The divided voltage is applied to the snubber capacitor 103 through the diode 102 so as to charge the snubber capacitor 103. The snubber capacitor 103 is charged to be twice as large as an electromotive force due to LC resonance incurred by the inductor 106 and the snubber capacitor 103 in the same manner as in the circuit in FIG. 3. Accordingly, it is necessary to take this point into consideration in advance so as to set a voltage division ratio by the inductors 2 and 106.

Figure 5:
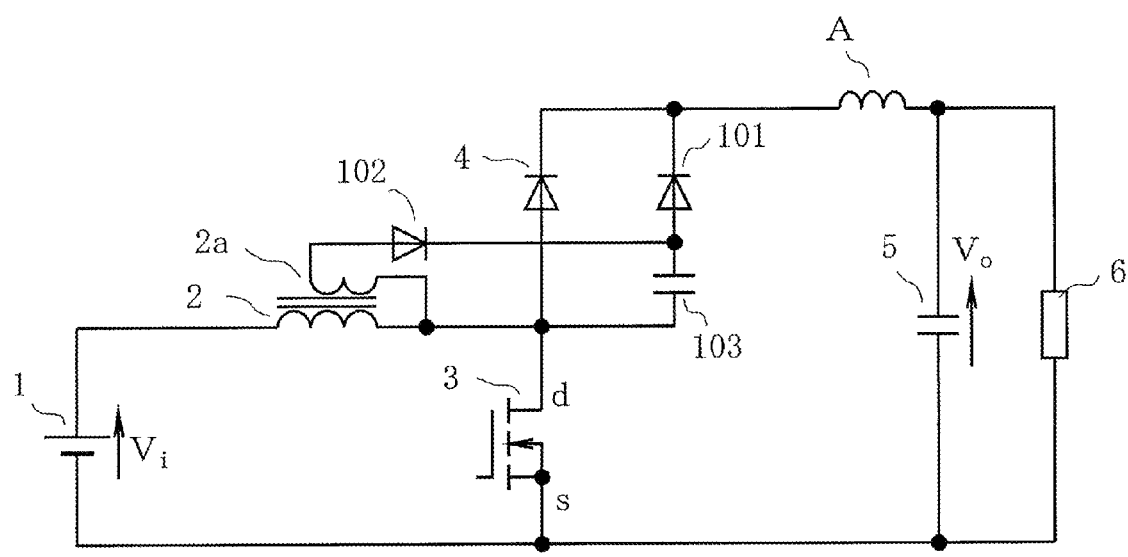
FIG. 5 is a circuit diagram showing a fourth embodiment of the invention.

Next, FIG. 5 is a circuit diagram showing a fourth embodiment of the invention.

In the embodiment, an auxiliary winding 2a is provided in the inductor 2 so that a voltage lower than the input voltage $V_i$ is generated from the auxiliary winding 2a by a transformer operation of the inductor 2 to thereby charge the snubber capacitor 103 through the diode 102. In this case, a series circuit consisting of a leakage inductance between the inductor 2 and the auxiliary winding 2a and the snubber capacitor 103 incurs LC resonance. Thus, the voltage of the snubber capacitor 103 is higher than an electromotive force generated based on a ratio between the number of turns of the inductor 2 and the number of turns of the auxiliary winding 2a. Accordingly, it is necessary to take this point into consideration to set the ratio between the number of turns of the inductor 2 and the number of turns of the auxiliary winding 2a.

Incidentally, when the voltage $V_i$ of the DC power supply 1 is always sufficiently lower than the output voltage $V_o$ (when a step-up ratio as the step-up chopper is higher), it is a matter of course that the first DC power supply 1 per se can be used as the second DC power supply 104 in FIG. 1 or FIG. 3.

Figure 6:
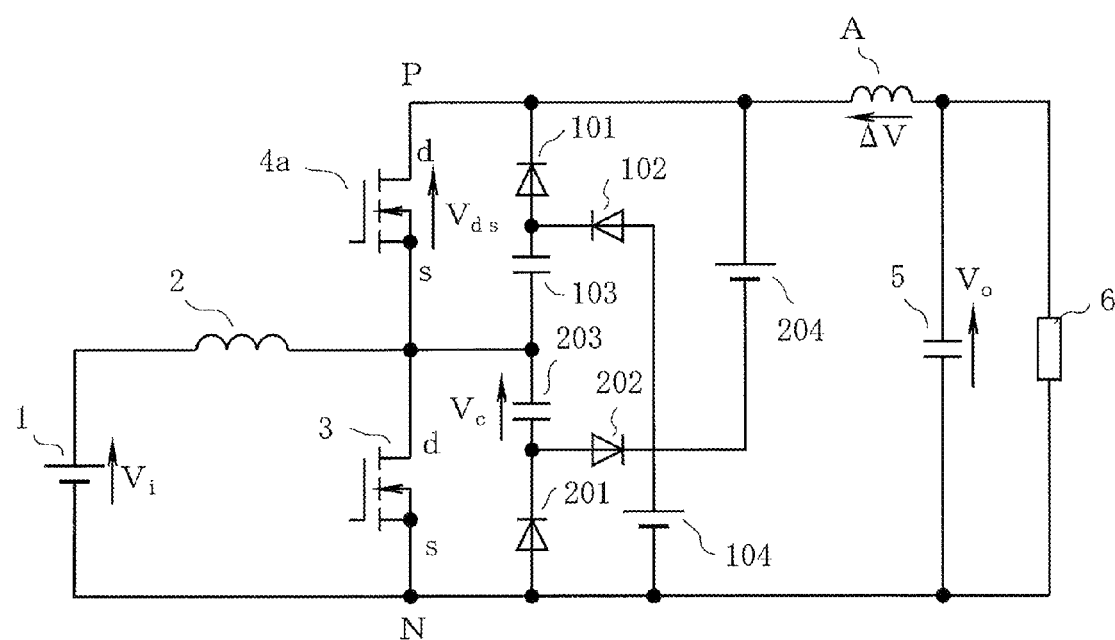
FIG. 6 is a circuit diagram showing a fifth embodiment of the invention.

Next, FIG. 6 is a circuit diagram showing a fifth embodiment of the invention.

In the embodiment, the diode 4 in FIG. 1 is replaced by a rectification function of a second semiconductor switching device 4a such as an MOSFET. Further, a second snubber capacitor 203 and a second snubber diode 201 are connected in series between a drain electrode d and a source electrode s of a first semiconductor switching device 3. A diode 202 and a third DC power supply 204 are connected in series between a connection point between the snubber capacitor 203 and the snubber diode 201 and a positive terminal P.

Normally, an MOSFET has a property in which the MOSFET conducts electricity in a direction (a direction from the source electrode s toward the drain electrode d) reverse to a flowing direction of an output current. The second semiconductor switching element 4a in FIG. 6 has the same rectification function as that of the diode 4 in FIG. 1. In addition, an electricity regeneration operation from the load 6 to the DC power supply 1 may be performed by switching the second semiconductor switching device 4a.

In FIG. 6, when the second switching device 4a is turned ON, a current flows from the load 6 back to the load 6 through the switching device 4a, the inductor 2 and the DC power supply 1 so that the current of the inductor 2 increases. When the switching device 4a is turned OFF, the current flows from the inductor 2 to the first switching device 3 through the DC power supply 1 so that the current of the inductor 2 decreases. Therefore, when a ratio of ON time in the second switching device 4a is controlled, the current of the inductor 2 can be controlled desirably. This circuit operation has been well known as a step-down chopper.

In the operation, the current flowing into a parasitic inductance A decreases due to the OFF of the switching device 4a so that a surge voltage $\Delta V$ occurs.

In FIG. 6, the series circuit of the snubber diode 201 and the snubber capacitor 203 is provided as a snubber circuit for controlling the surge voltage $\Delta V$, and the series circuit of the diode 202 and the third DC power supply 204 is provided as a charging circuit for charging the snubber capacitor 203.

In a period of time when the switching device 4a is ON, the current flows from the DC power supply 204 back to the DC power supply 204 through the switching device 4a, the snubber capacitor 203 and the diode 202 so that the voltage $V_c$ of the snubber capacitor 203 is charged up to the voltage of the DC power supply 204. When the switching device 4a turns OFF so that a drain-to-source voltage $V_{ds}$ of the switching device 4a reaches $(V_o - V_c)$, the snubber diode 201 turns ON. Accordingly, the drain-to-source voltage $V_{ds}$ of the switching device 4a takes a value in which $V_c$ has been subtracted from a P-to-N voltage, i.e. $(V_o + \Delta V)$, so as to be kept lower than the P-to-N voltage. Thus, an overvoltage can be prevented from being applied between the drain and the source of the switching device 4a.

Incidentally, the configuration and operation principle of the series circuit of the first and second switching devices 3 and 4a in the circuit shown in FIG. 6 are the same as those in a one-phase part of a bridge inverter. Accordingly, a snubber circuit including a snubber diode 101 or 201, a snubber capacitor 103 or 203, etc. can be applied also to a single-phase inverter or a three-phase inverter.

What is claimed is:

1. A DC voltage conversion circuit comprising:
   a first DC power supply;
   a first semiconductor switching device which is connected to two ends of the first DC power supply through an inductor;
   a series circuit which is connected in parallel with the switching device and which includes a rectifier device, a parasitic inductor and a load, so that an input voltage supplied from the DC power supply can be converted into an output voltage with a predetermined magnitude by a switching operation of the switching device and supplied to the load;
   a series circuit which is connected to two ends of the rectifier device and which includes a first snubber capacitor and a first snubber diode; and
   a charging circuit which charges the first snubber capacitor to a voltage lower than the input voltage or the output voltage in a period of time when the switching device is ON,
   wherein the charging circuit includes a series circuit of a second DC power supply and a diode,
   wherein a current does not flow into the first snubber diode and the first snubber capacitor until a sum of a voltage of the first semiconductor switching device and a voltage of the first snubber capacitor exceeds a voltage across the load; and
   when a sum of the voltage of the first semiconductor switching device and the voltage of the first snubber capacitor exceeds the voltage across the load, a surge voltage occurs in the parasitic inductor.

2. The DC voltage conversion circuit according to claim 1, wherein:
   the charging circuit further includes an inductor.

3. The DC voltage conversion circuit according to claim 2, wherein:
   a series circuit of a second snubber capacitor and a second snubber diode is connected in parallel with the first semiconductor switching device; and a series circuit of a third DC power supply and a diode is connected between a connection point between the second snubber capacitor and the second snubber diode and one end of the load so as to serve as a charging circuit for charging the second snubber capacitor.

4. The DC voltage conversion circuit according to claim 1, wherein:
   a second semiconductor switching device which is connected in series with the first semiconductor switching device is provided in place of the rectifier device so that the rectifier device is replaced by a rectification function of the second semiconductor switching device.

* * * * *